United States Patent Office 3,353,623
Patented Nov. 21, 1967

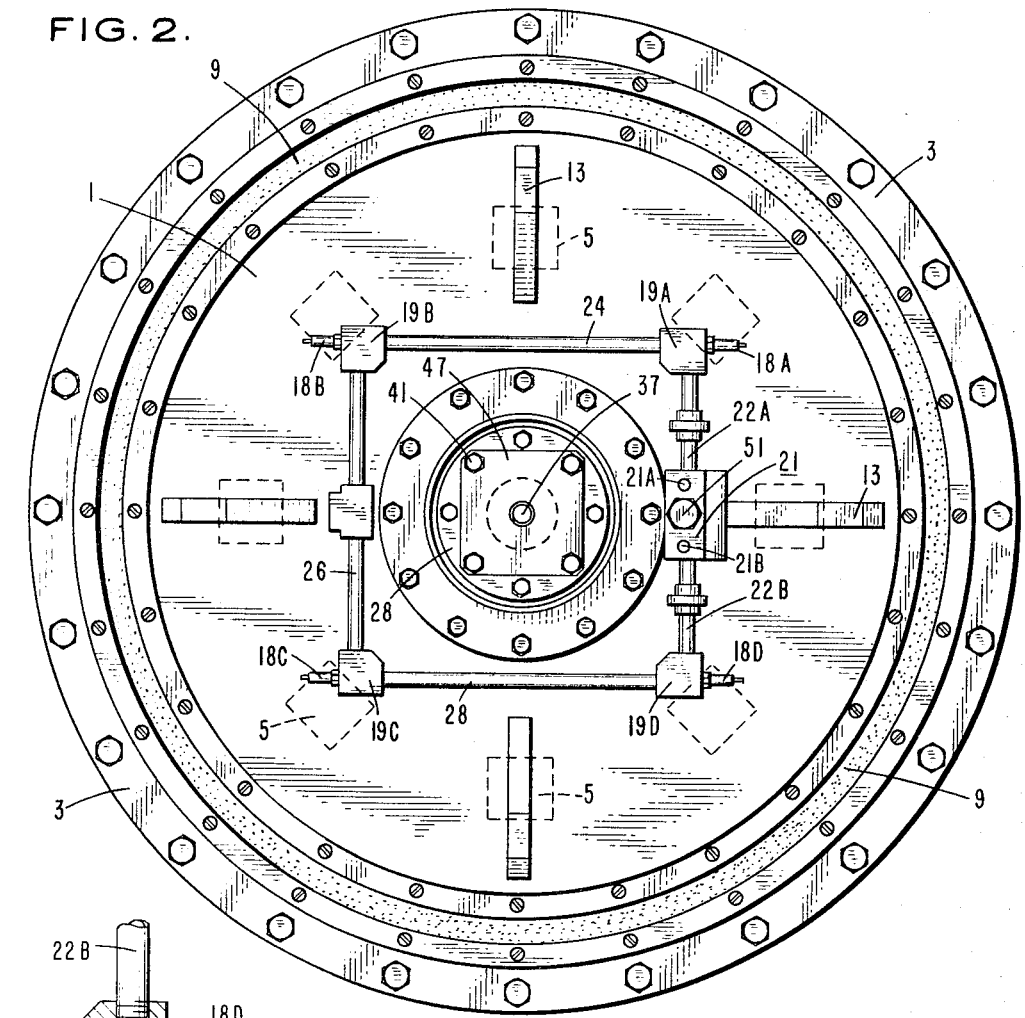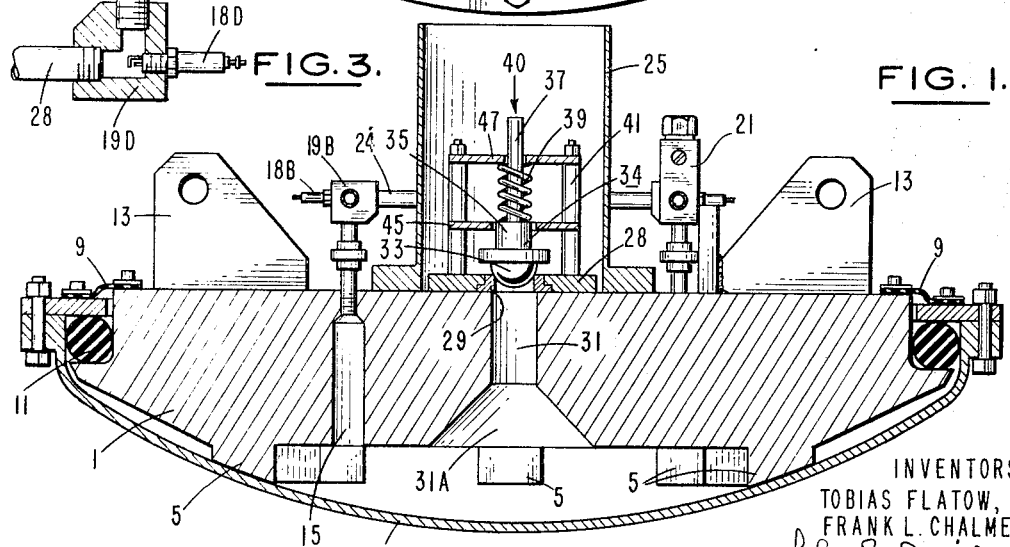

3,353,623
SEISMIC PULSE GENERATOR USING COMBUSTIBLE GAS
Tobias Flatow and Frank L. Chalmers, Houston, Tex., assignors to Esso Production Research Company, a corporation of Delaware
Filed Feb. 10, 1966, Ser. No. 526,535
4 Claims. (Cl. 181—.5)

ABSTRACT OF THE DISCLOSURE

Gas exploder seismic source uses dished earth coupling member connected to heavy upper reaction member by toroidal resilient sealing member. Exhaust port in reaction member controlled by valve piston having a spherical seating portion that is normally urged against a valve seat in the port.

---

This invention relates generally to sources of seismic waves for use in seismic exploration, and more particularly to a seismic wave generator making use of a gas explosion as the energy source for the generation of seismic waves.

In the seismic technique for delineating the earth's subsurface, a seismic disturbance is produced at or near the earth's surface and resulting seismic waves are detected at at least one location on the earth's surface to produce a seismogram. Seismic waves travel from the location at which the disturbance is initiated via many paths. Some of the seismic waves travel directly to the receiving location or locations, while others are reflected or refracted at interfaces in the subsurface structure of the earth whereat the velocity of seismic waves undergoes a change. A skilled interpreter of seismograms can learn much about the nature of the earth's subsurface from seismogram events produced by such reflected and refracted waves.

The conventional technique for producing seismic waves in the past has been to explode dynamite in a shot hole that is usually drilled into the earth to a point beneath the weathered layer of the earth. In recent years substantial effort has been expended in developing surface sources for the production of seismic waves so that the cost of seismic exploration can be reduced and, if possible, so that the results obtainable by using the seismic technique can be improved. One type of source that has been developed in recent years makes use of the detonation of an explosive gas mixture in a confined space resting on the earth's surface. (By "earth's surface" is meant not only the surface of the ground, but also the surface of water-covered areas of the earth.) Such sources have given considerable difficulty for a number of reasons. For example, some sort of valving arrangement is necessary in order to exhaust the products of combustion from the enclosed chamber. The valving arrangements used in the past have generally been unsatisfactory because of mechanical difficulties associated with the expansion of metals as a result of the tremendous amount of heat generated by the gas combustion and with the production of water vapor that tends to corrode valve parts.

Accordingly, one object of the invention is to provide a surface seismic source utilizing explosive gases as the source of energy that is simple, rugged, and relatively maintenance-free.

Another object of the invention is to provide a surface seismic source utilizing explosive gases as the energy source wherein an exhaust valve is provided which is not susceptible to maloperation as the result of heat generated by the combustion of the explosive gases and by water vapor produced thereby.

Another object of the invention is to provide such a surface seismic source wherein component parts susceptible to heat damage are relatively isolated from the heat generated by combustion of explosive gases.

Other objects and features of the invention not apparent from the above discussion will become evident upon consideration of the following detailed disclosure of the invention taken in connection with the accompanying drawings, wherein:

FIG. 1 is a cross-sectional view of a surface seismic source in accordance with the invention;

FIG. 2 is a top view of the apparatus illustrated in FIG. 1;

FIG. 3 is an enlarged fragmentary view showing one of the spark plug installations of the apparatus;

Figure 4:
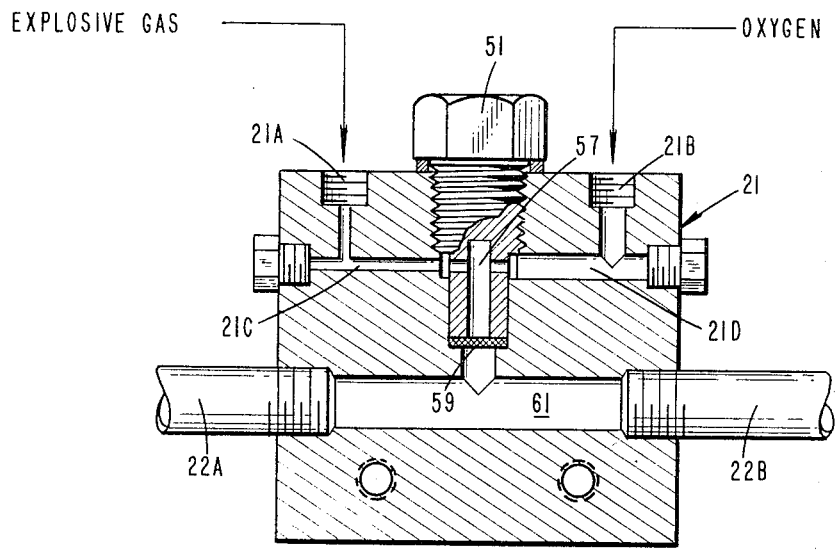
FIG. 4 is a cross-sectional view of the mixing valve arrangement 19 of FIG. 1.

With reference now to FIG. 1, there is illustrated a heavy reaction mass or plate 1, which preferably is generally circular in form and which may be of the order of five feet in diameter and weigh in the vicinity of 6000 pounds. An annular notch or recess is formed around the upper outer edge of the plate 1 for accommodating a toroidal sealing means, which may be a large O-ring 11 having a cross-sectional diameter of about three inches and formed of neoprene. A dished earth coupling member 3 below the reaction plate 1 extends up and over the sealing member 11 and engages the upper portion of the sealing member 11 so that the reaction plate 1, the sealing member 11, and the earth coupling member 3 form a closed combustion chamber. The reaction mass 1 is supported on the earth coupling member 3 by a plurality of wedges 5 so that the coupling member 3 and the reaction mass 1 are both kept in engagement with the sealing means 11 at all times whereby no gas can escape around the sealing member 11 from the closed chamber. An annular strap 9, which may be formed of 60 durometer neoprene, is affixed to the upper outer edge of the reaction mass 1 and to the edge of the earth coupling member 3 for the purpose of preventing water from seeping into the chamber formed thereby. The earth coupling member 3 is generally dished in shape but may have at least a partially flat bottom, if such is convenient, for operating at ground locations. The curved dished construction illustrated in FIG. 1 is most convenient for operating at water-covered locations where the earth coupling member 3 is to contact the surface of the water. For the purpose of introducing an explosive gas mixture into the closed chamber formed as described above, there is provided a mixing manifold 21 for the purpose of mixing an explosive gas, such as propane or acetylene, introduced thereinto through port 21A and air or oxygen introduced through port 21B. The construction of the mixing manifold is best illustrated in FIG. 3. As illustrated, the inlet ports 21A and 21B respectively communicate through channels 21C and 21D with a bore 57 in a bolt 51, which holds a fire screen 59, through which the explosive gases pass into a bore 61, which communicates with pipes 22A and 22B. The fire screen 59 is for the purpose of preventing flash-back of burning gases into the explosive gas source coupled to port 21A. A plurality of spark plug headers 19A, 19B, 19C, and 19D are interconnected in a rectangular arrangement by coupling pipes 24, 26, 28, 22A, 22B, and mixing manifold 21. Gas flows from the mixing manifold 21 through pipes 22A and 22B to the spark plug headers 19A and 19D, and from there through pipes 24 and 28 to the headers 19B and 19C. Each of the headers communicate with a port 15 drilling through the reaction plate 1 so that gas can flow from each of the headers into the chamber formed by the reaction plate 1, earth coupling member 3, and sealing member 11. Only one such port 15 is illustrated in FIG. 1. As illustrated with respect to spark plug header 19A in FIG. 2, spark plugs 18A, 18B, 18C, and 18D are respectively threaded into the spark plug headers 19A, 19B, 19C, and 19D so that the firing gap between the electrodes thereof is approximately directly over the port 15 corresponding thereto.

For the purpose of exhausting the products of combustion from the chamber, there is provided a centrally located port 31 in the reaction plate 1 terminating at its lower end in a frustoconically flared section 31A. This port 31 is conveniently about three inches in diameter. At the upper end of the port and affixed to the upper surface of reaction plate 1 is a valve mechanism 40 for sealing the port 31 when gas is being injected thereinto through ports 15, and for exhausting the products of combustion when the pressure inside the explosive chamber is greater than about 50–100 p.s.i. This valve 40 consists of an annular, blind flange 28 bolted to the reaction plate 1 and has a valve seat insert 29 having a circular opening therein for accommodating the spherical portion 33 of a valve piston 34. As illustrated, the spherical portion 33 is hemispherical in shape and has a diameter somewhat greater than the diameter of the opening in the valve seat 29 so as to properly seat thereon. An elongated guide rod having a lower portion 35 of one diameter and an upper portion 37 of a reduced diameter is affixed to the hemispherical portion 33 of the valve piston. The valve piston is held in place by first and second plates 45 and 47, respectively, which have openings therein for accommodating the enlarged portion 35 and the reduced portion 33 of the guide rod so that the guide rods are in sliding fit therewith. The plates 45 and 47 are supported on the blind flange 28 by post 41. A coil spring 39 surrounds the valve guide rod upper portion 37 and engages the lower portion 35 of the guide rod and the upper plate 47 for urging the valve piston spherical portion 33 against the valve seat.

For the purpose of lifting the assembly described above, a plurality of lifting lugs 13 are welded to the reaction plate 1 at equiangularly spaced locations around the upper surface thereof. In addition, there is provided an exhaust pipe 25 surrounding the valve 40 for the purpose of directing the products of combustion upwardly to a suitable height for protecting personnel that may be in the immediate vicinity of the seismic source when it is actuated.

Figure 5:
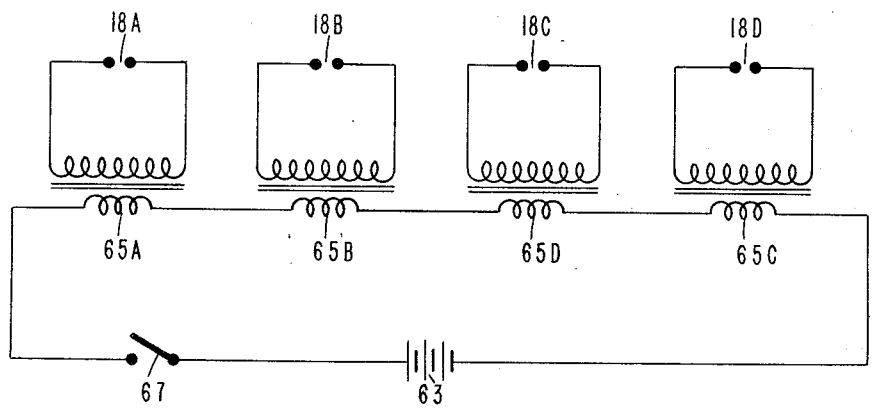
FIG. 5 is an electrical schematic diagram of apparatus for electrically energizing the spark-producing devices illustrated in FIGS. 1 and 2.

With reference to FIG. 5, the electrodes of the spark plugs are individually connected to the secondaries of ignition transformers 65A, 65B, 65C, and 65D, the primaries of which are connected in series with an energy source 63, such as a battery, and a switch 67. When switch 67 is opened, the primaries are simultaneously actuated so that the spark plugs 18A, 18B, 18C, and 18D simultaneously fire to ignite the explosive gas mixture in the spark plug firing heads 19A, 19B, 19C, and 19D. The explosion will instantly progress through the ports 15 into the explosive chamber. The explosion of the gases in the explosive chamber will cause the earth coupling member to move downwardly and impulse the earth. The reaction mass will remain relatively stable. When the products of combustion reach a pressure of 50–100 p.s.i., valve 40 will open and the products of combustion will be vented through pipe 25 to the atmosphere. A tremendous amount of heat is generated inside the explosive chamber. After valve 40 is again closed, these gases will cool so that a partial vacuum is produced in the explosive chamber, which vacuum may be of the order of 15 inches of water. In effect, the explosive chamber is self-purged.

Although the embodiment disclosed in the preceding specification is preferred, other modifications will be apparent to those skilled in the art which do not depart from the scope of the broadest aspects of the invention.

What is claimed is:

1. A seismic source for converting the energy of an explosive gas to seismic waves, comprising:
    a heavy upper reaction plate having a recess around the outer edge of the upper surface thereof;
    a toroidal resilient sealing member in said recess;
    a curved dished earth coupling lower member extending up and over said sealing member and engaging the upper portion of said sealing member whereby said lower member, said reaction plate, and said sealing member form a closed chamber;
    at least one gas inlet means in fluid communication with said closed chamber for injection of an explosive gas into said closed chamber;
    at least one spark-producing means in fluid communication with said closed chamber for igniting explosive gas in said closed chamber;
    exhaust port means extending through said reaction plate; and
    valve means on said reactilon plate normally closing said exhaust port and means adapted to open said exhaust port means responsive to a given pressure within said closed chamber, said valve means including an annular valve seat in said port means having a circular opening therein, a valve piston having a spherical portion for seating on said valve seat to close said circular opening, and spring means urging said spherical portion into normal seating engagement with said valve seat adapted to yield under a predetermined pressure to open said valve means.

2. The combination of claim 1 wherein said valve means includes an annular valve seat in said exhaust port means having a circular opening therein, and a valve piston having a spherical portion for seating on said circular opening, and an elongated guide rod having a lower portion of one diameter and an upper portion of a reduced diameter, first and second plates having openings therein for a accommodating said elongated guide rod, means connected to said heavy upper reaction plate for positioning said first and second plates one above the other above said heavy upper reaction plate, and coil spring means surrounding said valve guide rod lower portion and engaging said guide rod lower portion and said heavy upper reaction plate for urging said valve piston spherical portion against said annular valve seat.

3. The combination of claim 2 further including a gas mixing means for mixing an explosive gas stream with $O_2$-containing gas stream, and conduit means connecting said gas mixing means to each of said gas inlet ports, said conduit means including means corresponding to each of said gas inlet ports for accommodating said spark-producing means for igniting said explosive gas.

4. A seismic source for operating at water-covered layers of the earth for converting the energy of an explosive gas to seismic waves, comprising:
    a heavy upper reaction plate having a recess around the outer edge of the upper surface thereof;
    a toroidal resilient sealing member in said recess;
    a curved dished earth coupling lower member extending up and over said sealing member and engaging the upper portion of said sealing member whereby said lower member, said reaction plate, and said sealing member form a closed chamber;
    at least one gas inlet means in fluid communication with said closed chamber for injection of an explosive gas into said closed chamber;
    at least one spark-producing means in fluid communication with said closed chamber for igniting explosive gas in said closed chamber;
    exhaust port means extending through said reaction plate; and valve means on said reaction plate normally closing said exhaust port and means adapted to open said exhaust port means responsive to a given pressure within said closed chamber.

References Cited

UNITED STATES PATENTS

| | | | |
|---|---|---|---|
| 2,933,068 | 4/1960 | Johnson et al. | 181—.5 |
| 3,029,733 | 4/1962 | McElory | 181—.5 |
| 3,235,027 | 2/1966 | Kilmer | 181—.5 |
| 3,256,501 | 6/1966 | Smith | 181—.5 |
| 3,260,327 | 7/1966 | McCollum | 181—.5 |
| 3,294,194 | 12/1966 | Sloan | 181—.5 |

BENJAMIN A. BORCHELT, *Primary Examiner.*

G. H. GLANZMAN, *Assistant Examiner.*